United States Patent [19]

Müller

[11] Patent Number: 4,610,655
[45] Date of Patent: Sep. 9, 1986

[54] APPARATUS FOR THE MANUFACTURE OF PAPER CONTAINERS

[75] Inventor: Berthold Müller, Süssen, Fed. Rep. of Germany

[73] Assignee: Michael Horauf Maschinenfabrik GmbH & Co. KG, Sussen, Fed. Rep. of Germany

[21] Appl. No.: 613,035

[22] Filed: May 22, 1984

[30] Foreign Application Priority Data

Jun. 28, 1983 [DE] Fed. Rep. of Germany ....... 3323190

[51] Int. Cl.⁴ ............................................. F16H 7/22
[52] U.S. Cl. ..................................... 493/108; 493/104
[58] Field of Search ............... 493/102, 104, 105, 107, 493/108, 111, 123, 124, 303, 308, 305, 109, 472, 113, 106, 306, 309, 386, 388, 389

[56] References Cited

U.S. PATENT DOCUMENTS

| 1,133,330 | 3/1915 | Small | 493/108 |
| 1,365,517 | 1/1921 | Luellen et al. | 493/106 |
| 2,135,219 | 11/1938 | Reifsnyder | 493/106 |
| 3,157,339 | 11/1964 | Negoro | 493/109 |
| 3,289,552 | 12/1966 | Corazzo | 493/107 |
| 3,835,619 | 9/1974 | Reisman | 493/109 |
| 3,855,908 | 12/1979 | Schmidt et al. | 493/109 |

FOREIGN PATENT DOCUMENTS 2227413 10/1976 Fed. Rep. of Germany .
3015112 10/1981 Fed. Rep. of Germany ...... 493/152

Primary Examiner—Francis S. Husar
Assistant Examiner—Robert Showalter
Attorney, Agent, or Firm—Burns, Doane, Swecker & Mathis

[57] ABSTRACT

In the manufacture of paper containers, a paper jacket is wound upon a first support mandrel. The wound jacket is transferred to a second support mandrel by a transfer device. A positioning device in the form of a circular ring is situated in front of the second support mandrel. The jacket is pushed through the ring en route to the second mandrel and thus becomes aligned with said second mandrel while simultaneously being shaped in accordance with the circular cross-section of the ring to conform to the circular cross-section of the second mandrel.

11 Claims, 2 Drawing Figures

APPARATUS FOR THE MANUFACTURE OF PAPER CONTAINERS

BACKGROUND AND OBJECTS OF THE INVENTION

The invention relates to an apparatus for the manufacture of paper containers, wherein a first support mandrel is provided for the winding and sealing of the container jacket, a second support mandrel is provided for the insertion of a container bottom into the container jacket, and a transfer device for transferring the wound container jacket from the first to the second mandrel is provided.

Facilities for the manufacturer of paper containers are known (see DE No. 2 227 413, column 1, line 63 to column 2, line 15), wherein initially a jacket blank is wound onto a first mandrel whereby the jacket seam is also sealed simultaneously. After this, the jacket is transferred to a second mandrel, on the frontal side of which a container bottom has been first placed. There are thus two support mandrels provided for the jacket, which must be transferred from one mandrel to the other. This known apparatus is designed for conical paper containers wherein the insertion of the container bottom in the container jacket is not difficult, as the container bottom may be inserted, for example, from the side of the jacket with the larger diameter.

Difficulties are, however, encountered in the manufacture of cylindrical paper containers. Since the container jacket, after winding and sealing and prior to the insertion of the container bottom, does not have an exactly circular cross-section (e.g., it is oval), in actual practice, it is difficult to transfer the container jacket to the second circular support mandrel.

It is an object of the invention to make it possible in installations of the afore-mentioned type to easily transfer the container jacket from the first support mandrel to the second support mandrel even when the container jacket is formed with a cross-sectional shape which does not correspond to the cross-sectional shape of the second mandrel.

SUMMARY OF THE INVENTION

The invention involves the use of a positioning device in association with the transfer device to align the container jacket with the second support mandrel and simultaneously shape the cross-section of the container jacket in accordance with the cross-section of the second mandrel.

The positioning device places the container jacket to be transferred from the first support mandrel to the second support mandrel in a position accurately aligned with the second support mandrel and simultaneously assures the required shape, e.g., circular. It is appropriate to place the positioning device directly in front of the second support mandrel. This insures the fact that no further inaccuracies will be incurred between the positioning device and the second support mandrel.

In a preferred embodiment of the invention the positioning device is in the form of a funnel ring. The latter is appropriately located coaxial with the second support mandrel, preferably at an axial distance of approximately 1 mm in front of it.

In a further development of the invention, the transfer device may comprise a gripper in the form of a pivoting suction sleeve. This pneumatic gripper may have a plier-like spread configuration or it may consist of a rigid half-shell and thereby be adjustable with respect to the container jacket. Conveniently, a piston axially displaceable in the suction sleeve is provided for the ejection of the container jacket, so that it is necessary for the suction sleeve to bring the container into the vicinity only of the positioning device, while the axial movement proper of the container jacket is effected by the piston.

In an advantageous embodiment of the invention, the second support mandrel is equipped on its frontal side facing the transfer direction with a receptacle for the container bottom. In this manner, the container bottom to be inserted into the jacket is given its proper orientation with respect to the jacket. The latter is placed onto the second support mandrel so that it projects only to the extent corresponding to the width of the bottom.

BRIEF DESCRIPTION OF THE DRAWINGS

The object and advantages of the invention will become apparent from the following detailed description of a preferred embodiment thereof in connection with the accompanying drawings in which like numerals designate like elements, and in which.

DETAILED DESCRIPTION OF A PREFERRED EMBODIMENT OF THE INVENTION

Figure 1:
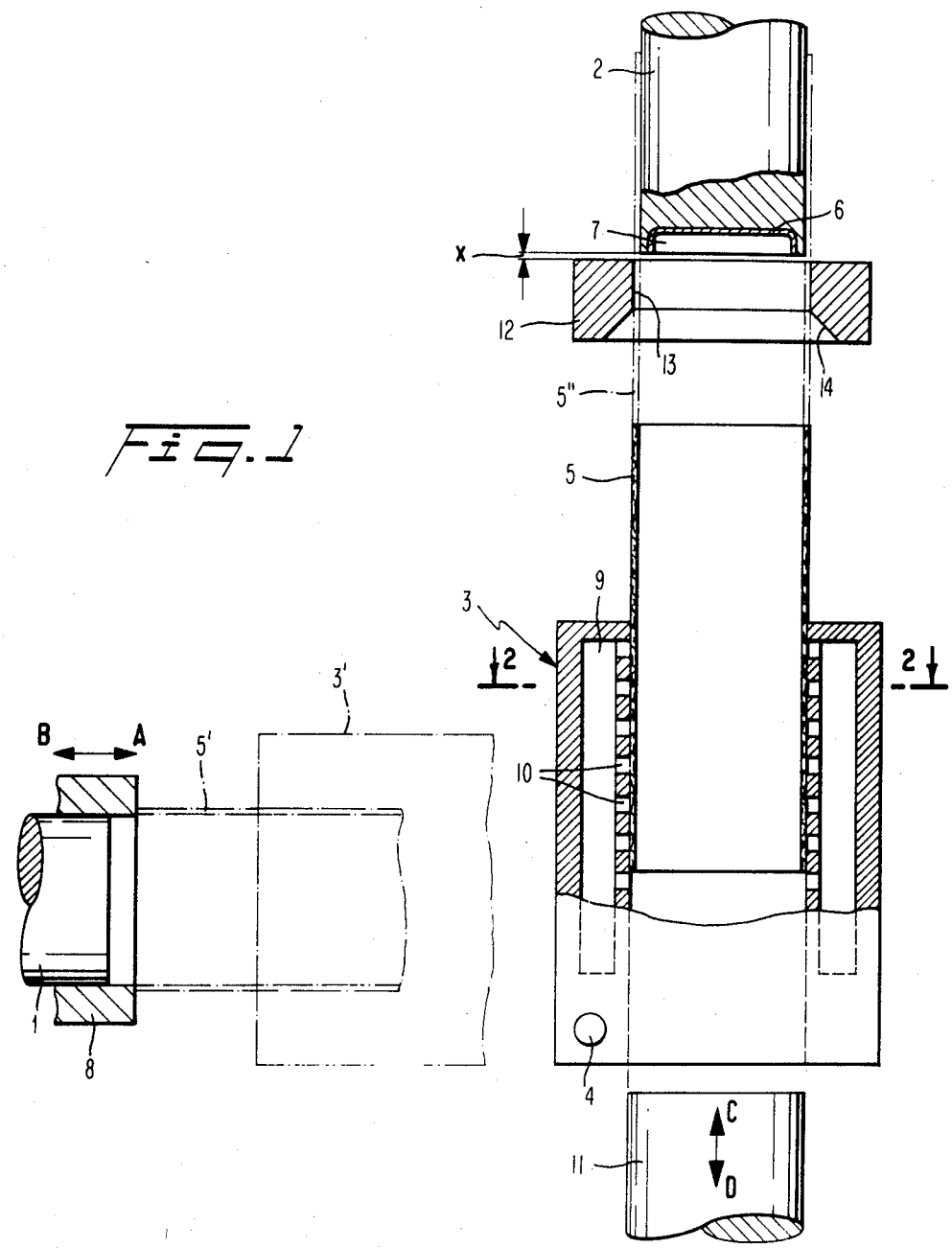
FIG. 1 depicts the ends of first and second mandrels, and a transfer device for transferring a container jacket from the first to the second mandrel. The container jacket and transfer device are depicted in broken lines as the container jacket is being discharged from the first mandrel, and in solid lines as the container jacket is generally aligned with the second mandrel. A suction sleeve portion of the transfer device is shown partially in longitudinal section.

FIG. 1 depicts a first support mandrel 1, which has a cylindrical configuration and upon which the winding of the container jacket and the sealing of the jacket seam takes place. The apparatus to produce paper containers further comprises a second cylindrical support mandrel 2 for the insertion of the container bottom into the container jacket. To transfer the container jacket from the first support mandrel 1 to the second support mandrel 2, a transfer device 3 is provided, which may be pivoted around an axle 4. The transfer device 3 may thus be pivoted back and forth from the position indicated by the solid lines (in a partial longitudinal section) to the position shown by dash-and-dot lines and designated 3', thereby transferring a jacket from a first position shown in broken lines at 5' to a second position shown in solid lines at 5.

The container jacket 5, already wound, is shown in a position wherein it has already been brought by the transfer device 3 to a position from which it is to be transferred to the second support mandrel 2. In a pocket 7 of the second support mandrel 2, a container bottom element 6 has already been inserted (the bottom element is not shown in detail, as it is not part of the invention proper).

In order to move the container jacket 5 into the aforedescribed second position, it must first be retracted from the first support mandrel 1. This is effected by a pressure sleeve 8 which is reciprocable in directions A and B, while sliding on the first support mandrel 1. During its motion in the direction A, the pressure sleeve 8 pushes the container jacket from the support mandrel 1 and moves it into the first position 5' wherein it may be received by the transfer device which is spreadable in the manner of a pair of pliers, as will be explained below. The transfer device is designated in this position by 3'. As soon as the container jacket 5' is free of the support mandrel 1, the transfer device may pivot around the axle 4 into the position designated 3 by means of any suitable power means such as a fluid cylinder (not shown).

In order for the transfer device 3 in the form of a suction sleeve to hold the container jacket 5, it is equipped on its inner, hollow cylindrical surface coordinated with the container jacket with a plurality of holes 10, which are connected with an annular space 9 that may be periodically partially evacuated, as required. The means for effecting such evacuation are conventional and are not shown. The reduced pressure results in the pneumatic gripping action of the suction sleeve 3.

As soon as the transfer device 3 has pivoted into the position shown in the figure by solid lines, a piston 11 is moved in the direction C, which piston presses against the container jacket (from below the jacket in the drawing). The piston 11 may be retracted, following the completion of its working stroke, in the direction D. The piston 11 moves the container jacket 5 in the axial direction onto the second support mandrel 2 until the container jacket 5 is projecting only slightly downward from the support mandrel 2, so that the bottom 6 may just be inserted subsequently. The mechanism for installing the bottom 6 to the container jacket 5 are not shown, as it is not part of the invention proper.

As mentioned hereinabove, the container jacket 5 which is ejected from the first mandrel 1 has an out-of-round (oval) cross-section. The jacket must be given a round configuration, corresponding to the circular cross-section of the second support mandrel 2 in order that the jacket can be installed thereon easily. For this reason, a positioning device 12 is associated with the transfer device 3. The positioning device is in the form of a funnel ring and placed at a distance x of approximately 1 mm in front of the second support mandrel 2. The funnel ring 12 has a cylindrical surface 13, which is slightly larger than the external diameter of the second mandrel 2 and which takes into account the wall thickness of the container jacket 5. In order for the container jacket 5 to be introduced into the hollow cylindrical surface 13 of the funnel ring 12, an inlet bevel 14 is provided in the form of a tapering frusto-conical face. It has been found surprisingly that by means of this simple measure the container jacket 5 may be brought readily into its round shape, so that it may be initially inserted into the inner surface 13 and from there moved onto the second support mandrel 2.

Thus, the positiong device 12 serves to align the container jacket 5 with the second mandrel while simultaneously shaping the cross-section of the container jacket in accordance with the cross-section of the second mandrel.

Following the return of the piston 11 in the direction D, the container bottom 6 may be inserted in a manner not shown in detail in the container jacket 5. By the fact that the bottom 6 is inserted on a support mandrel 2 independent of the winding of the cylindrical container jacket 5, the basic cycle of the production of paper containers may be significantly increased.

Figure 2:
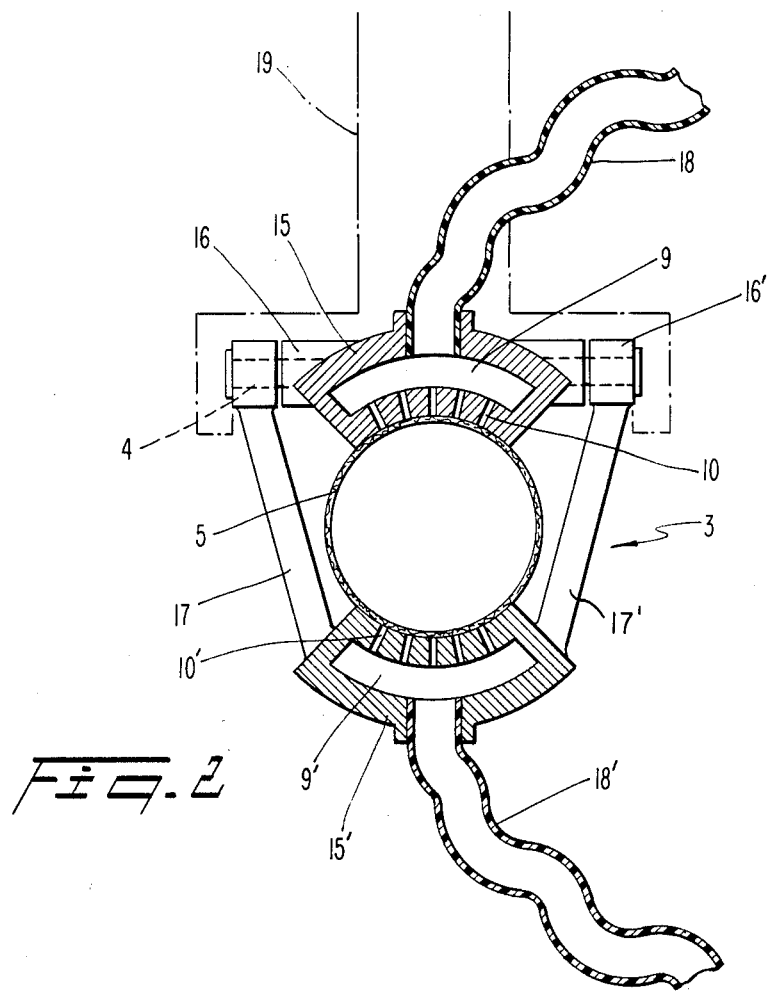
FIG. 2 is a cross-sectional view taken through the transfer device of FIG. 1 along line 2—2.

The transfer device 3 is depicted in cross-section in FIG. 2. The axle 4 is supported by a frame 19 depicted in broken lines. First and second tong members 15, 15' are mounted on the axle 4. The first and second tong members 15, 15' are carried by first and second hubs 16, 16', respectively, which are directly mounted on the axle 4. Arms 17, 17' interconnect the second hub with the second tong. The second hub 16' is rotatable about the axle 4 by any suitable power mechanism (not shown), such as a fluid driven cylinder for example. Thus, the tongs 15, 15' can be mutually separated for receiving a jacket 5, and then are closed to clamp the jacket. The tongs are in the shape of circular segments so as to deform the jacket to a circular shape when the latter has been clamped. Holes 10, 10' in the tongs communicate with air suction manifolds 9, 9'. Air suction hoses 18, 18' communicate with those manifolds, by means of which a vacuum is imposed upon the jacket to further secure the jacket against the tongs.

Although the present invention has been described in connection with a preferred embodiment thereof, it will be appreciated by those skilled in the art that modifications, substitutions, additions, and deletions not specifically described may be made without departing from the spirit and scope of the invention as defined in the appended claims.

What is claimed is:

1. An apparatus for the manufacture of paper containers, comprising: a cylindrical first support mandrel upon which a cylindrical container jacket is wound and sealed; a cylindrical second support mandrel upon which the container jacket is inserted for the installation of a container bottom into the container jacket, said second mandrel having an end edge on one end and an outer peripheral surface of a given size and shape extending from said end edge, said one end arranged to carry said container bottom and insert same into said jacket when said jacket is inserted onto said second mandrel; transfer means arranged between said first and second mandrels for receiving the container jacket completely removed from said first mandrel and pushing said jacket onto said second mandrel toward and beyond said end edge thereof such that said jacket is inserted onto said peripheral surface in sliding engagement therewith to locate said bottom within said jacket; said transfer means including curved surface means having a curvature corresponding substantially to that of said jacket for receiving said jacket as the latter is removed longitudinally from said first mandrel; and positioning means including a passage therethrough and disposed adjacent to and in alignment with said end edge of said second mandrel, said transfer means arranged to push said jacket through said passage and onto said outer peripheral surface of said second mandrel for aligning said jacket with said second mandrel and simultaneously shaping the cross-section of said outer surface to facilitate the insertion of said jacket onto said second mandrel, said passage including a cylindrical inner surface having a cross-sectional shape of said outer surface of said second mandrel and being slightly larger than said outer surface in accordance with the thickness of said jacket.

2. Apparatus according to claim 1, wherein said positioning device includes a circular cylindrical internal surface arranged coaxially relative to said second mandrel, said second mandrel having a circular cylindrical cross-section, the radius of said cylindrical internal surface of said positioning device being greater than the radius of said second mandrel by a distance substantially equal to the wall thickness of the container jacket.

3. Apparatus according to claim 2, wherein said cylindrical internal surface is preceded by a bevel surface.

4. Apparatus according to claim 1, wherein said positioning means comprises a funnel ring.

5. Apparatus according to claim 4, wherein said funnel ring is coaxial with said second mandrel.

6. Apparatus according to claim 5, wherein said funnel ring is spaced a distance of about 1 mm in front of said second mandrel.

7. Apparatus according to claim 1, wherein said transfer means comprises a gripper in the form of a pivotably mounted suction sleeve.

8. Apparatus according to claim 7, wherein said sleeve contains a reciprocable piston for ejecting the container jacket and pushing the latter toward said second mandrel.

9. Apparatus according to claim 1, wherein said second mandrel includes a front surface having a recess for the reception of a container bottom.

10. Apparatus according to claim 1, wherein said positioning means is located between said second mandrel and said transfer means.

11. Apparatus according to claim 1, wherein said curved surface means of said transfer means comprises suction holes through which a suction pressure is transmitted to grip said jacket, and a piston movable longitudinally between said surfaces to push a jacket onto said second mandrel.

* * * * *